United States Patent [19]

Chretien

[11] Patent Number: 5,137,547
[45] Date of Patent: Aug. 11, 1992

[54] PROCESS AND APPARATUS FOR PREPARING A GAS COMPONENT FROM A GAS MIXTURE

[75] Inventor: Denis Chretien, Saint Mande, France

[73] Assignee: L'Air Liquide, Societe Anonyme Pour L'Etude et L'Exploitation Des Procedes Georges Claude, Paris, France

[21] Appl. No.: 719,789

[22] Filed: Jun. 24, 1991

[30] Foreign Application Priority Data

Jun. 25, 1990 [FR] France .................. 90 07931

[51] Int. Cl.$^5$ .................. B01D 53/04; B01D 53/22
[52] U.S. Cl. .......................... 55/16; 55/25; 55/58; 55/59; 55/68
[58] Field of Search ............ 55/16, 25, 26, 58, 59, 55/62, 68, 74, 75, 189, 387, 389, 158

[56] References Cited

U.S. PATENT DOCUMENTS

| | | | |
|---|---|---|---|
| 2,273,350 | 2/1942 | Fry et al. ................... | 55/58 X |
| 3,696,588 | 10/1972 | Dussourd et al. .......... | 55/189 X |
| 3,834,136 | 9/1974 | Dussourd et al. .......... | 55/189 X |
| 3,934,989 | 1/1976 | Haugen ...................... | 55/189 X |
| 4,229,188 | 10/1980 | Intille ......................... | 55/16 |
| 4,238,204 | 12/1980 | Perry .......................... | 55/16 |
| 4,314,828 | 2/1982 | Saito et al. ................. | 55/26 |
| 4,331,456 | 5/1982 | Schwartz et al. ........... | 55/58 X |
| 4,421,532 | 12/1983 | Sacchetti et al. ........... | 55/58 X |
| 4,436,534 | 3/1984 | Sequy ......................... | 55/58 |
| 4,701,187 | 10/1987 | Choe et al. ................. | 55/16 |
| 4,863,492 | 9/1989 | Doshi et al. ................ | 55/25 X |
| 4,880,449 | 11/1989 | Babyak ....................... | 55/189 X |
| 4,919,695 | 4/1990 | Trepaud ...................... | 55/189 X |

FOREIGN PATENT DOCUMENTS 0266745 11/1987 European Pat. Off. .
0344053 5/1989 European Pat. Off. .
2442983 11/1978 France .

OTHER PUBLICATIONS

Chemical Abstracts, vol. 108, No. 12, Mar. 21, 1988, p. 151.

*Primary Examiner*—Robert Spitzer
*Attorney, Agent, or Firm*—Curtis, Morris & Safford

[57] ABSTRACT

Process for manufacturing a gas component in pure form by separation through adsorption from other components of a gas mixture including inter alia combustible components, of the type in which a flow of the gas mixture at a high cycle pressure is sent through an adsorbent which gives, during a production stage, at the high cycle pressure, the gaseous component which is not adsorbed, for example pure hydrogen, then, during a desorption-elution stage, a desorption gas or residual gas under a low cycle pressure, which is added, after having raised its pressure, to a network of auxiliary gas, which is available under higher pressure, the addition of the residual gas to the auxiliary gas being carried out by sending the residual gas into an ejector which operates under the effect of a driving gas normally available under high pressure.

10 Claims, 3 Drawing Sheets

PROCESS AND APPARATUS FOR PREPARING A GAS COMPONENT FROM A GAS MIXTURE

BACKGROUND OF INVENTION (a) Field of the Invention

The present invention concerns a process for the production of at least one gas component from a gas mixture containing the gas component to be produced, comprising the steps of sending a flow of the gas mixture under a first pressure through a device for separation by adsorption to give, during a production stage, substantially at the first pressure, the gas component, and, during a stage of desorption-elution, at a second pressure lower than the first pressure, a first residual gas, and raising the pressure of the first residual gas to combine same with a flow of auxiliary gas.

(b) Description of Prior Art

In the processes of this type, the intent is to valorize the residual gas and the most simple manner, since this residual gas generally contains combustible gases, is to add same to an auxiliary network of combustible gas, so-called "fuel-gas" network, which is generally available on site, since, for example for the preparation of pure hydrogen, the process is generally associated with an appended apparatus of a petrochemical complex or a petroleum refinery, where such "fuel-gas" network recovers different purged gases, for example hydrodesulfurization purged gases available under high pressure and which are expanded at substantially lower pressures, for example of the order of 5 to $6 \times 10^5$ Pa, through a simple valve, and which constitutes the service pressure of the "fuel-gas" network. Hereinafter, in the present patent application, the pressure of this "fuel-gas" network or more generally of a network of auxiliary gas is designated average pressure, since it is currently located between the high cycle pressure and the low cycle pressure of the adsorption unit for preparing the gas component. As a matter of fact, and notwithstanding the pressure of the gas component, typically in hydrogenated form, to be treated in the adsorption unit, it would be of the upmost interest to utilize a low cycle pressure which would be as low as possible, since the gas component yield of the adsorption unit—which is represented by the ratio of the volume of the gas component produced to the volume of the gas component in the initial mixture—is more particularly elevated, the lower the low pressure of the cycle, which results, without giving more complicated details, from a better desorption, therefore a better regeneration of the adsorbent of the adsorption unit and it is not rare that for this purpose a process is close to atmospheric pressure, sometimes below atmospheric pressure. It should be understood that it is not therefore simply possible to add this residual gas under this low pressure directly to the "fuel-gas" network under "mean" pressure.

Depending on cases, this residual gas is added by correspondingly raising the low cycle pressure, to the detriment of the yield of the gas component produced, or by utilizing a compressor, which enables to maintain the yield of the gas component produced, but constitutes a costly solution in equipment and maintenance expenses, as well as in consumption of energy.

SUMMARY OF INVENTION

It is an object of the present invention to provide a process with the production with a high yield corresponding to a low cycle pressure which would be satisfactory—therefore quite lower than the so-called mean pressure of the auxiliary network—without the disadvantages mentioned above of utilizing a compressor, and this object of the invention is achieved by introducing the residual gas at the second pressure into an injector which is supplied with a flow of driving gas at a third pressure higher than the second pressure before combining the residual gas with the flow of auxiliary gas.

It is therefore a specific aspect of the invention to have associated the problem resulting from a desorption pressure which is too low with the existence on the production site of a network of auxiliary gas initially under high pressure and which, in known valorized manner, is expanded to be at the usual pressures of utilization on the one hand, and the possiblity to raise the pressure of a flow of residual gas of the adsorption unit by the driving effect of a gas under very high pressure, all in a manner to rely on a mixture of residual gas and auxiliary gas under the usual pressure. However, on the basis of this first general proposal, the invention proposes, for example if the flow of gas mixture to be treated—under the high cycle pressure—is in excess of the needs for supplying the gas component to be produced, to withdraw a portion of this gas mixture to constitute the driving gas of the ejector. Also, if the gas mixture under pressure which is treated by adsorption is available at a higher pressure than the high cycle pressure selected, and for example if, to ensure a good operation of the permeation unit, the initial gas mixture should be enriched with the gas component to be produced by treating same by means of a permeation unit through membranes with selective permeability producing a permeated product which is enriched in gas component to be produced and under a reduced pressure which however corresponds to the high cycle absorption pressure and a residual gas substantially under said higher pressure, steps are taken so that the residual gas under the high pressure be used, at least in part, as driving gas for the ejector of residual gas which is produced in the following absorption step.

The invention is also concerned with a production unit for carrying out the process.

BRIEF DESCRIPTION OF DRAWINGS

The invention will now be described with reference to the annexed drawings in which.

DESCRIPTION OF PREFERRED EMBODIMENTS

Figure 1:
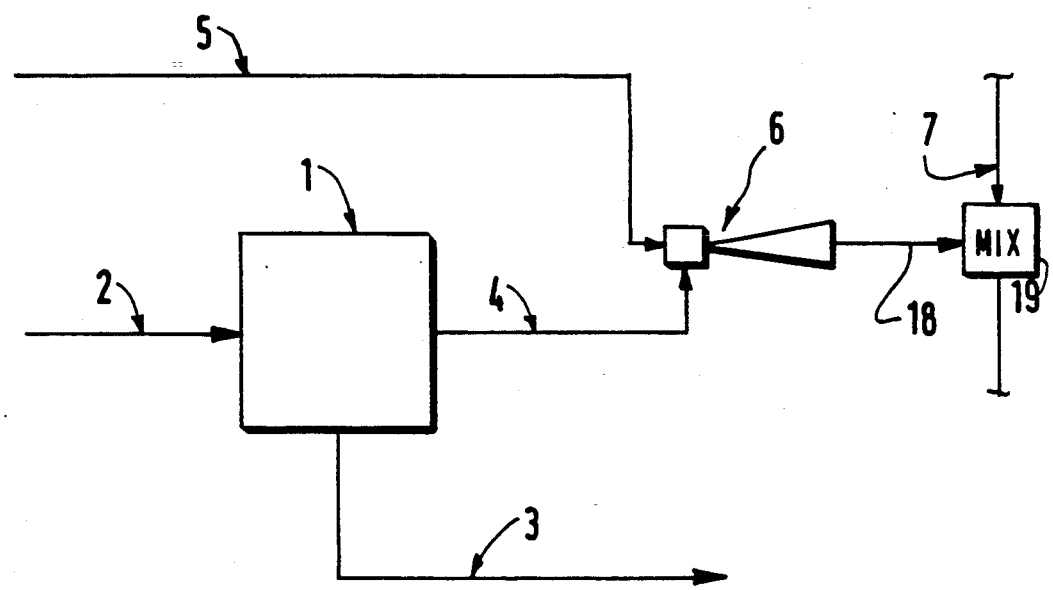
FIG. 1 is a schematic view of an apparatus for the production of a pure gas component according to the invention.
Figure 2:
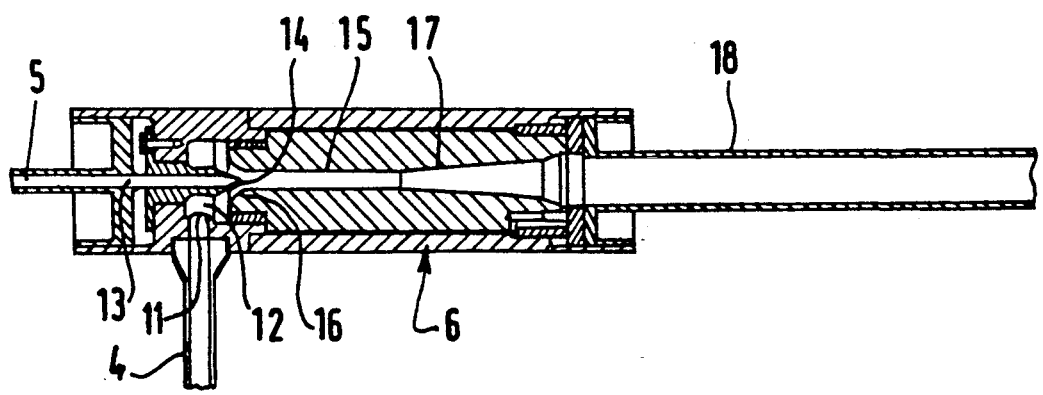
FIG. 2 is a cross-section view of the ejector.

There is illustrated schematically on FIGS. 1 and 2, an apparatus for the production of a gas component, for example pure hydrogen, comprising an absorption unit 1, not illustrated in detail, but generally comprising a plurality of absorbers each undergoing a cycle comprising a step of production under a pressure which is, or reaches, the high cycle pressure, a step of decompression, possibly with one or more equilibrations with one or more absorbers, during recompression, possibly with a container for storing an elution gas, a final decompression at low cycle pressure supplying a residual gas, a step of elution-purge for eluting at the low cycle pressure also supplying a residual gas, and a step of recompression at the production pressure, all in a manner to produce in a cyclic fashion, from a flow introduced at 2 of the mixture to be treated, an outlet flow of pure hydrogen introduced at 3, substantially under the same pressure as the mixture introduced at 2, and a flow of a residual gas mixture introduced at 4 under a low pressure, generally in the vicinity of atmospheric pressure.

According to the invention, the residual gas 4 is introduced at 11 in a chamber 12 of an ejector 6, around an axial duct 13 for introducing a driving gas 5 under high pressure, and emerging into a restricted nozzle 14 at the inlet of a tuyere 15 converging at 16—diverging at 17 to produce an outlet gas flow 18 at an intermediate pressure between the low pressure of the residual gas 4 and the high pressure of the carrier gas 5, but at a pressure which is suitable for adding at 19 in a line 7 a network of auxiliary gas, typically combustible gas called "fuel-gas".

Figure 3:
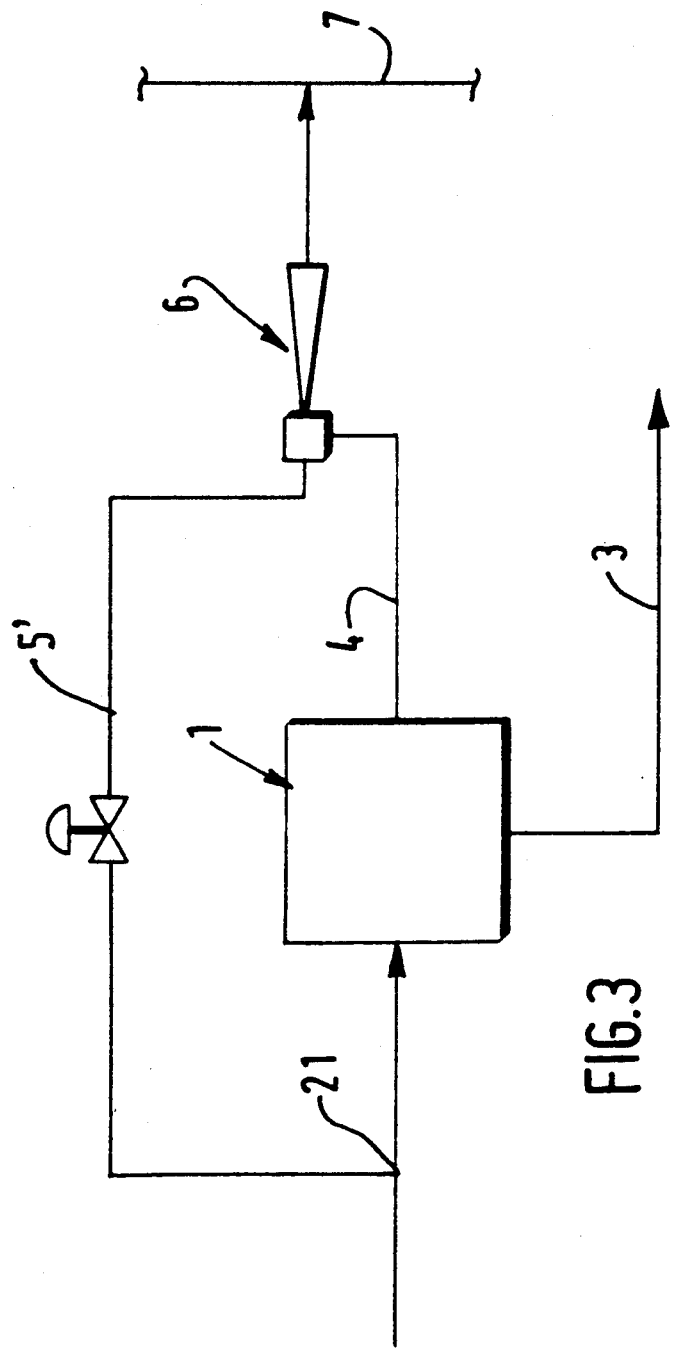
FIG. 3 and 4 are variant embodiments of the invention.

According to the variant illustrated in FIG. 3, which includes the adsorption unit 1, the ejector 6 and the "fuel-gas" network 7, the driving gas 5' consists here of a flow withdrawn at 21 from the excess flow of initial gas mixture 2 under high cycle pressure. Since the yield of the adsorption unit is improved, this arrangement enables to treat less gas for the same production, so that the size of the equipments is reduced. The saving thus realized is higher than the cost of the ejector.

Figure 4:
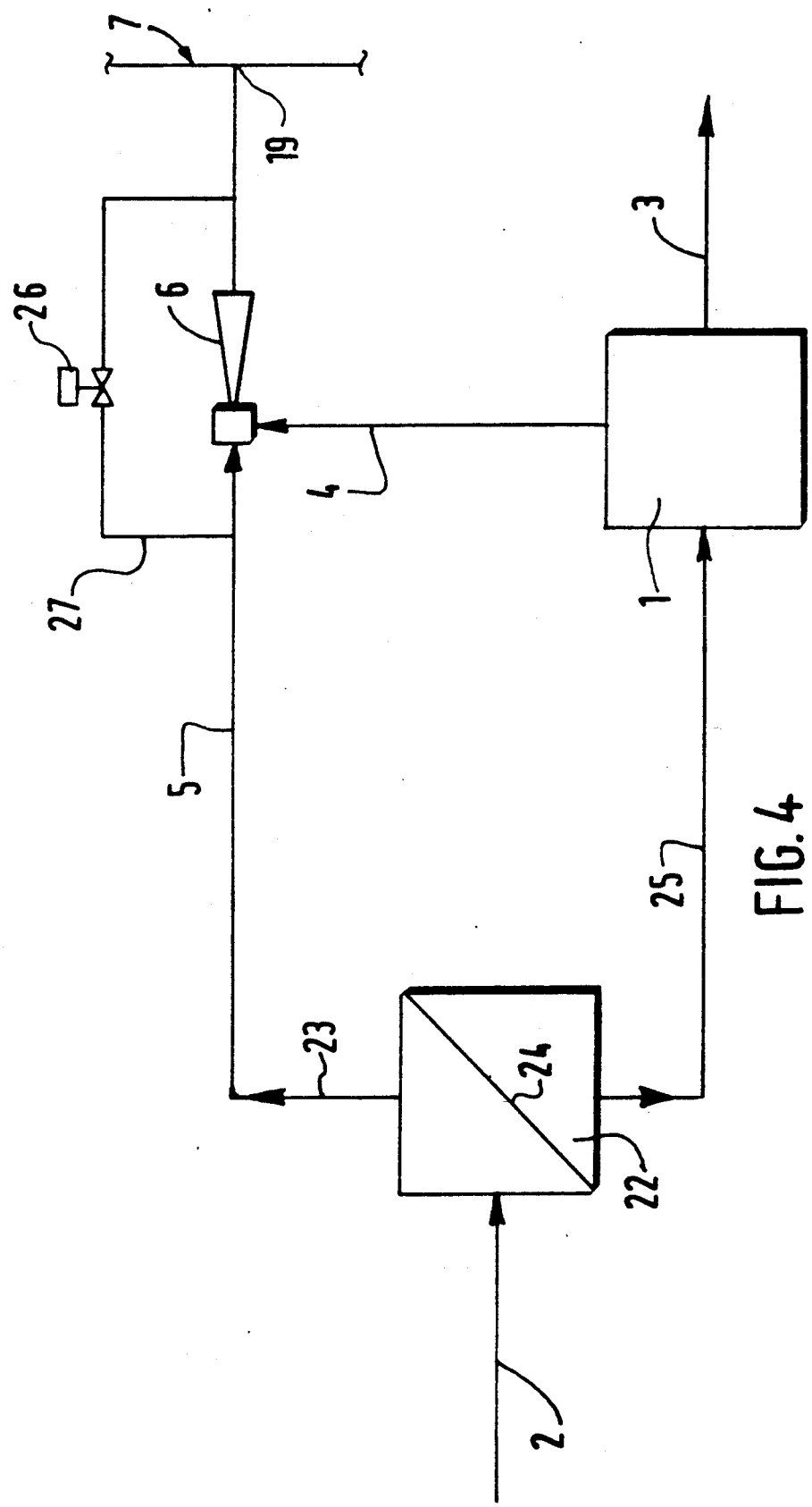

In the embodiment of FIG. 4, the adsorption unit is associated, upstream, to a unit 22 for the enrichment in a component to be produced, for example hydrogen, which produces a residual gas flow 23 which has not passed through the membranes 24 of the permeation unit 22, and which is therefore available under the elevated pressure of the inlet mixture 2, and a permeation flow 25 which is enriched in the component to be produced and is at a lower pressure, but which is sufficiently high to constitute the high cycle pressure of the adsorption unit 1 producing pure hydrogen 3 under high pressure and a residual gas 4 under low pressure. The residual gas flow 23 under high pressure is here used as driving gas for the ejector 6, and if it has an excess flow, a portion 27 is derived between the inlet and outlet of the ejector 6 to be expanded at 26 at the outlet pressure of the ejector.

EXAMPLES OF APPLICATION

Example 1

A hydrogen gas mixture having the following composition is purified:

| Components | % Mole |
|---|---|
| $H_2$ | 85.46 |
| $CH_4$ | 8.94 |
| $C_2H_6$ | 2.62 |
| $C_3H_8$ | 1.17 |
| $C_4H_{10}$ | 1.02 |
| $C_5H_{12}$ | 0.68 |
| $H_2S$ | 0.11 |

The hydrogenated mixture is available at $30 \times 10^5$ Pa and 38° C. The flow of feeding gas is 1672 Nm³/h.

Hydrogen should be purified at a purity of 99.999%.

The residual amount should reach the "fuel-gas" network at a pressure of $6.1 \times 10^5$ Pa absolute.

In the known processes (without ejector), the residual gas is directly returned to the fuel gas network at $6.1 \times 10^5$ Pa. 900 Nm³/h of pure hydrogen is thus produced.

The details can be written as follows:

| | Feed | $H_2$ produced | Residual |
|---|---|---|---|
| flow Nm³/h | | | |
| $H_2$ | 1428.6 | 900 | 528.6 |
| $CH_4$ | 149.4 | | 149.4 |
| $C_2H_6$ | 43.8 | | 43.8 |
| $C_3H_8$ | 19.6 | | 19.6 |
| $C_4H_{10}$ | 17.1 | | 17.1 |
| $C_5H_{12}$ | 11.4 | | 11.4 |
| $H_2S$ | 1.8 | | 1.8 |
| total flow | 1671.7 | 900 | 771.7 |
| composition | | | |
| $H_2$ % vol | 85.46 | 99.999 | 68.50 |
| $CH_4$ | 8.94 | 10 vpm | 19.36 |
| $C_2H_6$ | 2.62 | | 5.67 |
| $C_3H_8$ | 1.17 | | 2.54 |
| $C_4H_{10}$ | 1.02 | | 2.22 |
| $C_5H_{12}$ | 0.68 | | 1.48 |
| $H_2S$ | 0.11 | | 0.23 |

The hydrogen yield is 63%.

In the vicinity of the adsorption unit a purging gas at a high pressure, intended to be burned as "fuel-gas" is on the other hand available. Its pressure is $28 \times 10^5$ Pa absolute, its flow is 1350 Nm³/h and its composition is given below:

| Components | % Volume |
|---|---|
| $H_2$ | 59.59 |
| $CH_4$ | 24.91 |
| $C_2H_6$ | 7.39 |
| $C_3H_8$ | 3.30 |
| $C_4H_{10}$ | 2.89 |
| $C_5H_{12}$ | 1.92 |

According to the invention, this gas is used as driving gas in the ejector 6 and thus enables to lower the pressure of the residual gas down to $2.8 \times 10^5$ Pa absolute.

The yield of the thus modified adsorption unit is substantially increased. It goes from 63% to 72%. The flow of hydrogen produced increases from 900 to 1030 Nm³/h, or 14%. Details are as follows:

| | Feed | $H_2$ produced | Residual |
|---|---|---|---|
| flow Nm³/h | | | |
| $H_2$ | 1428.6 | 1030 | 398.6 |
| $CH_4$ | 149.4 | | 149.4 |
| $C_2H_6$ | 43.8 | | 43.8 |
| $C_3H_8$ | 19.6 | | 19.6 |
| $C_4H_{10}$ | 17.1 | | 17.1 |
| $C_5H_{12}$ | 1.4 | | 11.4 |
| $H_2S$ | 1.8 | | 1.8 |
| total flow | 1671.7 | 1030 | 641.7 |
| composition | | | |
| $H_2$ % vol | 85.46 | 99.999 | 63.12 |
| $CH_4$ | 8.94 | 10 vpm | 23.28 |
| $C_2H_6$ | 2.62 | | 6.83 |
| $C_3H_8$ | 1.17 | | 3.05 |
| $C_4H_{10}$ | 1.02 | | 2.66 |
| $C_5H_{12}$ | 0.68 | | 1.78 |
| $H_2S$ | 0.11 | | 0.28 |

(the residual from the above details corresponds to residual (4) of the schematic illustration of FIG. 1 and not to the mixture which comes out of the ejector).

This process enables for example to increase and without substantial overcosts the yield of the adsorption unit 1.

On the other hand, the low pressure of the residual gas enables to decrease the size of the equipments of the adsorption unit. In the above example, the volume of adsorbent per bottle goes from 2.8 to 1.9 m$^3$, or a gain of 32%. The volume of the elution bottle goes from 20 to 10 m$^3$, or a gain of 50%. These gains on the equipments produce substantial savings of the price of the adsorption unit which largely counterbalances the cost of the ejector.

These savings on the size of the equipments produce a maximum efficiency when there is an excess of an initial hydrogenated mixture with respect to the needs. In this case it is possible to treat only a portion of the hydrogenated mixture as described in FIG. 3 and the other portion is used as driving gas in the ejector. The savings are not then based really on the increase of the yield, which is not here the first object since there is an excess of hydrogenated mixture, but on the size of the equipments.

Example 2

Another example of application concerns the combination of a permeation unit per membrane with a unit for separation by adsorption according to FIG. 4.

The permeated product 25 has a total flow of 7841 Nm$^3$/h containing 6286 Nm$^3$ of hydrogen. In a known process without ejector, when the residual gas 23 of the permeation unit 22 is simply expanded through a valve, the production of pure hydrogen 3 is 4085 Nm$^3$/h. In the process according to the invention, an ejector 6, with the same amount of material associated with the permeation unit 22, increases the production of pure hydrogen up to 5029 Nm$^3$/h, or an increase of 23%. The total yield of the permeation and adsorption units goes from 46% to 56.7%.

If instead of increasing the production capacity, the intention is to decrease the size of the equipments for the same production, the savings are as follows:

unitary volume of adsorbent: −56% ;
volume of elution gas stored: −45%.

Although the present invention has been described with respect to specific embodiments, it is not limited thereby but, on the contrary, it is capable of modifications and variants which will appear to one skilled in the art.

The present invention can be used for example for the separation of hydrogen from a mixture containing hydrogen and carbon dioxide at the outlet of a device for reforming with vapor, to the separation of helium from a mixture containing helium and methane, or the separation of hydrogen and argon from an ammonia purged gas. In this latter case, a synthesis gas is compressed and sent to a device for the synthesis of ammonia including the purged gas, at a pressure of about $200 \times 10^5$ Pa, is sent to the device for separating by adsorption 22 of FIG. 4, the hydrogen and argon enriched permeate, at a pressure of about $30 \times 10^5$ Pa being sent to the inlet of the device for separation by adsorption 1. The residual gas, which is enriched in argon, of the separation device 1 is sent, as previously, to the ejector 6 whose driving gas is made of the residual gas, which comes from the device for separation by permeation and the ejected mixture, at a pressure of about $5 \times 10^5$ Pa, is sent to a cryogenic cold box for the recovery of pure liquid argon.

I claim:

1. A gas separation process comprising the steps of:
    passing a flow of a first gas mixture at a first pressure through pressure swing absorption means to produce a product gas substantially at the first pressure and a first residual gas at a second pressure lower than the first pressure;
    introducing the first residual gas into ejector means supplied with a flow of a driving gas at a third pressure which is higher than the second pressure to produce a flow of a mixed gas; and
    mixing the flow of the mixed gas with a flow of an auxiliary gas which is at a fourth pressure greater than the second pressure.

2. The process of claim 1, wherein said third and fourth pressures are of substantially the same magnitude.

3. The process of claim 12, wherein the driving gas is derived from said first gas mixture by withdrawing a portion therefrom.

4. The process of claim 1, wherein the first gas mixture contains hydrogen.

5. The process of claim 4, wherein the first gas mixture contains hydrocarbons.

6. The process of claim 5, wherein the auxiliary gas is a fuel gas.

7. The process of claim 1, further comprising the steps of:
    directing a flow of a second gas mixture at a fifth pressure higher than the first pressure to a permeation separating unit to separate the second gas mixture into the first gas mixture at the first pressure and into a second residual gas substantially at the fifth pressure and
    supplying the second residual gas to said ejector means as the driving gas.

8. The process of claim 7, wherein the second gas mixture contains hydrogen.

9. The process of claim 8, wherein the first gas mixture contains hydrocarbons.

10. The process of claim 9, wherein the auxiliary gas is a fuel gas.

* * * * *